(12) United States Patent
McCauley, III et al.

(10) Patent No.: US 6,557,046 B1
(45) Date of Patent: *Apr. 29, 2003

(54) METHOD AND SYSTEM FOR PROVIDING AN EVENT SYSTEM INFRASTRUCTURE

(75) Inventors: David E. McCauley, III, Redmond, WA (US); Edward K. Jung, Bellevue, WA (US); Christopher S. Heidorn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,016

(22) Filed: Apr. 2, 1999

Related U.S. Application Data

(63) Continuation of application No. 08/640,722, filed on May 1, 1996, now Pat. No. 5,999,986.

(51) Int. Cl.[7] ................................................. G06F 9/54
(52) U.S. Cl. .................................................... 709/318
(58) Field of Search .............................. 709/310–320, 709/328, 329

(56) References Cited

U.S. PATENT DOCUMENTS

| | | | |
|---|---|---|---|
| 4,866,638 A | 9/1989 | Cosentino et al. | 364/521 |
| 5,321,838 A | 6/1994 | Hensley et al. | 395/700 |
| 5,333,302 A | 7/1994 | Hensley et al. | 395/575 |
| 5,355,484 A | 10/1994 | Record et al. | 395/650 |
| 5,485,617 A | 1/1996 | Stutz et al. | 395/700 |
| 5,517,645 A | 5/1996 | Stutz et al. | 395/700 |
| 5,630,072 A | 5/1997 | Dobbins | 399/222 |
| 5,638,504 A | 6/1997 | Scott et al. | 395/7.61 |
| 5,724,589 A * | 3/1998 | Wold | 709/318 |
| 6,212,676 B1 * | 4/2001 | Seaman et al. | 717/116 |

OTHER PUBLICATIONS

Kaiser et al., "An Object–Based Programming Model for Shared Data", ACM Computing Surveys, vol. 143, No. 2, pp. 201–264.*

Chin et al., "Distributed Object–Based Programming Systems", ACM Computing Surveys, vol. 23, No. 1, pp. 91–124.*

K. Brockschmidt, "Inside OLE", Second Edition, Microsoft Press, 1995, pps. 44–45, 187–218, 277–301, 639–641, 1101–1144.

"Developing NeXTSTEP™ Applications", SAMS Publishing, 1995, Chapter 10, pps. 118–144.

Boykin et al, "Programming Under Mach", Addison–Wesley Publishing Company, 1993, Chapter 3, pps. 63–97 and Chapter 7, pps. 207–247.

Masoni et al, "Performance of the Obelix Event Builder and Producer", IEEE, 1993, pps. 549–551.

"Events in Paradox 4.0", DBMS, Aug. 1992, vol. 5(9), pp. 22.

(List continued on next page.)

*Primary Examiner*—St. John Courtenay, III
(74) *Attorney, Agent, or Firm*—Westman, Champlin & Kelly, P.A.

(57) ABSTRACT

An event architecture facilitates the asynchronous invocation of events at an event sink. The events are triggered by direct invocation of methods on the event sink. A backchannel connection may be utilized to pass control information from an event sink to an event source. The use of the backchannel connection creates bidirectional connections between an event source and an event sink. A guardian object may be situated between the event source and the event sink to facilitate the asynchronicity of event delivery and to account for disparate threading models between the event source and the event sink. A third party connector may be utilized to connect the event source with the event sink.

19 Claims, 11 Drawing Sheets

OTHER PUBLICATIONS

"Professional Features—Microsoft® Visual Basic—Programming System for Windows™", Professional Edition, 1992, Chapter 2, pps. 7–14 and Chapter 8, pps. 57–63.

"Programmer's Guide—Microsoft® Visual Basic—Programming System for Windows™", 1992, pps. 112–118.

"Event Handlers for an Object–Oriented Officevision", IBM Technical Disclosure Bulletin, vol. 34(4A), Sep. 1991.

L.R. Walmer et al, "A Programmer's Guide to the Mach System Calls", Department of Computer Science, Carnegie–Mellon University, Version of Dec. 28, 1989, pps. 1–27.

G.F. Coulouris et al., "Distributed Systems—Concepts and Design", Addison–Wesley Publishing Company, 1988, Chapter 4, pps. 81–114.

"Programming Windows", Microsoft Press, 1988, pps. 61–23 and 169–171.

M. Accetta, "Mach: A New Kernel Foundation for UNIX Development", School of Computer Science, Carnegie Mellon University, 1986, pps. 93–112.

R.S. Chin et al, "Distributed Object–Based Programming System", ACM Computing Surveys, vol. 23, No. 1, pp. 105.

G.E. Kaiser et al, "An Object–Based Programming Model for Shared Data", ACM Transactions of Programming Languages and Systems, vol. 143, No. 2, pp. 230.

* cited by examiner

METHOD AND SYSTEM FOR PROVIDING AN EVENT SYSTEM INFRASTRUCTURE

This application is a continuation of patent application Ser. No. 08/640,722 filed May 1, 1996 now U.S. Pat. No. 5,999,986 and entitled "Method and System for Providing an Event System Infrastructure".

TECHNICAL FIELD

The present invention relates generally to computer systems and more particularly to the management of events in computer systems.

BACKGROUND OF THE INVENTION

The Microsoft OLE 2.01 protocol provides a standard way for objects to fire events and provides a connection architecture for connecting event sources with event sinks. The event and connection architectures provided by Microsoft OLE 2.01 are in large part achieved by defining "interfaces." In Microsoft OLE 2.01, an "interface" is a named set of logically related functions. Each interface lists signatures for a set of functions, but does not provide code for implementing the set of functions; rather, objects provide the code for implementing the functions. Such objects are said to "support" the interfaces for which they provide code.

Microsoft OLE 2.01 specifies a component object model (COM). The component object model is implemented through a set of fundamental application program interface (API) functions and interfaces. The API functions provide for object creation, management and marshalling. A component object is one that complies with certain constraints set forth in COM.

The event architecture enables an event source to source events that are sinked by an event sink. As will be described in more detail below, an event source triggers events on an event sink by calling methods on the event sink. Events are logically grouped into semantically-related event sets, and interfaces are defined for each event set that an event sink wishes to sink. Interfaces are provided to provide a form of registration so that an event sink may register to sink events that are sourced by an event source. The registration occurs on a per-event set basis. The event sink and event source are typically separate processes and may reside on the same machine or on different machines.

The event source exposes connection points to which an event sink may connect. Each connection point is associated with a particular event set and indicates that the event source is ready to source events for the associated event set. A connection point may be connected by multiple connections to multiple event sinks. An event source may have multiple connection points (indicating the willingness of the event source to source multiple instances of event sets). The event source connection point container serves as a container of the connection points. Each connection point is typically implemented as a separate sub-object but need not be. Each connection point is assigned a globally unique identifier (GUID), which is a 128 bit value that uniquely identifies an interface or object.

FIG. 1 is a block diagram showing objects and interfaces supported by the objects that play a central role in the event architecture provided by Microsoft OLE 2.01. In FIG. 1, an event sink 10 is connected to both event source 12 and event source 14. Each of the event sources 12 and 14 is a connection point container that contains respective connection points 16A, 16B and 18A, 18B. Each of the event sources 12 and 14 supports the IConnectionPointContainer interface. The line with a circle attached to one end that is labeled "IConnectionPointContainer" serves as a graphical indicator to indicate that the object (i.e., event source 12 or 14) supports the named interface. The IConnectionPointContainer interface is formally defined as:

```
interface IConnectionPointContainer: public IUnknown
{
    HRESULT EnumConnectionPoints (IEnumConnectionPoints
    ** ppEnum);
    HRESULT FindConnectionPoint(REFIID iid, IConnectionPoint
    ** ppCP);
};
```

As is apparent from the above definition, the IConnectionPointContainer interface includes two methods. The first method, the EnumConnectionPoints( ) method enumerates the connection points that are contained within the connection point container. Microsoft OLE 2.01 defines a number of enumerator interfaces and methods that enumerate items so that list of items may be communicated and iterated through. This method is an example of such an enumerator method. The result of calling EnumConnectionPoints is that each of the connection points contained in the event source is enumerated. The FindConnectionPoint( ) method returns a connection point that is associated with a particular interface identifier (IID).

Each event set has an associated instance of an interface that the event sink supports. For example, in FIG. 1, event sink 10 supports a set of events in the ISomeEvents interface. The ISomeEvents interface includes a number of methods that may be called from a connection point to trigger associated events. Events are triggered by calling the associated method in the event set interfaces that the event sink 10 supports. Multiple connection points may call methods in a common event set interface. For example, in FIG. 1, connection point 16A and connection point 18A from event sources 12 and 14, respectively, may trigger calls to methods in the ISomeEvents interface instance that is provided by event sink 10. Likewise, it should be appreciated that an event sink may support multiple instances of event set interfaces. For example, in FIG. 1, the event sink 10 supports instances of both the ISomeEvents interface and the IOtherEvents interface. The event sink 10 supports multiple instances of the IOtherEvents interface. No source identity information is passed on an event invocation. Thus, an event sink must set up a forwarding interface for each source to which it is connected. For example, in FIG. 1 separate forwarding objects 19A and 19B have been registered for the separate instances of the IOtherEvents interface.

Each connection point 16A, 16B, 18A and 18B supports the IConnectionPoint interface. This interface is formally defined as:

```
interface XConnectionPoint: public IUnknown
{
    HRESULT GetConnectionInterface(IID * pIID);
    HRESULT GetConnectionPointContainer(IConnectionPointContainer
    ** ppCFC);
    HRESULT Advise(IUnknown * pUnkSink, DWORD * pdwCookie);
    HRESULT Unadvise (DWORD dwCookie);
    HRESULT EnumConnections (IEnumConnections**PpEnum);
};
```

As can be seen from the above interface definition, the IConnectionPoint interface supports five methods. The GetConnectionInterface( ) method names the event set interface which the connection point is willing to call on the event sink to trigger events. Thus, for connection point 16A, calling the GetConnectionInterface( ) function returns the IID for the instance of the ISomeEvents interface that is provided by the event sink 10. The GetConnectionPointContainer( ) method allows an event sink or other caller to navigate back to the connection point container that contains the connection point. The Advise( ) method creates an advisory connection with an event sink, and the Unadvise( ) method breaks the connection. The EnumConnections( ) method enumerates the event sinks that are currently connected to the connection point.

FIG. 2 is a flowchart illustrating the steps that are performed by an event sink to establish a connection with an event source and begin the process of firing events. Initially, the event sink obtains an interface pointer for the IConnectionPointContainer interface from the event source to which it seeks to connect Microsoft OLE 2.01 provides the QueryInterface( ) method that returns the interface pointer for a requested interface. The event sink obtains the interface pointer for the IConnectionPointContainer by calling the QueryInterface( ) method on the event source (step 24 in FIG. 2). For the example shown in FIG. 1, the event sink 10 calls QueryInterface( ) on both event source 12 and event source 14 to obtain an interface pointer for the IConnectionPointContainer interface. The event sink 10 then calls the FindConnectionPoint( ) method for each event set that it wishes the event source to source (step 26 in FIG. 2). For example, in FIG. 1, the event sink 10 calls the FindConnectionPoint( ) method twice to locate connection points 16A and 16B for event source 12. Similarly, the event sink 10 calls the FindConnectionPoint( ) method twice to locate connection points 18A and 18B on event source 14.

The connection of the event sink to each of the connection points is completed by calling the Advise( ) method in the IConnectionPoint interface for each of the connection points (step 28 in FIG. 2). In the example shown in FIG. 1, the Advise( ) method in the respective instances of the IConnectionPoint interface supported by connection points 16A, 16B, 18A and 18B is called. Once these connections are realized, the event sources 12 and 14 may fire events through the event set interfaces (step 30 in FIG. 1).

Events are called on a single thread of control in a synchronous fashion to provide a single unbroken-path of execution. Events may be called locally or across process and machine boundaries. Whether the called object is local or remote is largely transparent to the caller due to the mechanisms provided by OLE. Calling threads are blocked until the call returns. The blocking mechanism may vary depending on whether the call is local or remote. One implication of this model is that the responsiveness of invoking the component depends on the ability of the invoked component to return control to the invoking component. This approach is adopted with each of the possible threading models for objects that COM supports. COM supports a single threaded model where all calls into the event sink are synchronized with the message queue for the thread on which the event sink object was created. This approach ensures that the event sink is guaranteed to only be called to process events on a single thread of execution. COM also supports an apartment model where objects created on a thread are guaranteed only to be called on that thread. Thus, the event sinks are guaranteed to be called only on the thread that created the event sink. A final threading model that can support a free threading model where in theory, multiple threads may concurrently call on the event sink. The event sink uses a synchronization mechanism to limit concurrent access to the event sink. The underlying threading models, however, appear to be the same to the caller because the RPC model has been made transparent.

Event sinks and event sources often are not resident on the same machines. Microsoft OLE 2.01 provides a mechanism for the marshalling of method calls so that the calls may be remotely transmitted between a client and a server. A "client" calls methods and a "server" implements methods which are called. In the events context, event sinks and event sources assume the roles of both client and server at various times. When the event sink calls on the IConnectionPointContainer and IConnectionPoint interfaces, the event sink acts as a client and the event source acts as a server. Once the connection is realized and the event source begins making calls on the event sink, the event source acts as the client and the event sink acts as the server.

The marshalling mechanism used in the event architecture allows the client to act as if the server being called exists locally in the process space of the client regardless of whether the server is a separate process running on a distinct machine. The marshalling mechanism enhances conventional RPC to allow the remoting of whole interfaces rather than single procedure calls. FIG. 3 is a block diagram illustrating several of the major components that play a role in the marshalling mechanism that is provided. On the client side, a proxy 36 provides an implementation of the methods of the interface that is being remoted. When the client 32 invokes a method on the proxy 36, the proxy 36 copies all of the in parameters of the method that is being invoked into a single linear buffer and outputs a message containing a pointer to the buffer and meta-data about the method that is being invoked. The proxy 36 supports the IRpcProxyBuffer interface. The proxy manager 38 is responsible for loading and unloading proxies for communication with the server 34. The proxy manager 38 is also responsible for managing the establishment and cleanup of the channel buffer 40. The channel buffer 40 encapsulates knowledge about the underlying transport mechanism used by the transport 41. The central role of the channel buffer 40 is to maintain the connection between the proxy 36 and the stub 42.

The server side includes the stub 42, which takes the buffer that has been filled by the proxy 36 and initiates a call on the intended method on the server 34. The stub 42 also receives out parameters from the server 34 when the server has completed the method invocation. The stub 42 marshalls the out parameters into a linear buffer and passes this linear buffer to the channel buffer 46. The stub 42 supports the IRpcStubBuffer interface. The stub manager 44 handles the freeing of stubs when they are no longer needed. In addition, the stub manager 44 cooperates with the proxy manager 38. The stub manager 44 is responsible for maintaining a list of all stubs which are loaded for a given remote client. The channel buffer 46 communicates with channel buffer 40 to translate the buffer holding the out parameters back to the proxy 36 which unmarshalls the out parameters, etc.

FIG. 4 is a flowchart illustrating the steps that are performed in a method invocation from a client to a server when the client and server exist in different execution contexts. Initially the client 32 calls a method on the proxy 36 (step 50 in FIG. 4). The proxy 36 computes the size of the marshalled data and calls the GetBuffer( ) method of the IRpcChannelBuffer interface that is supported by channel buffer 40 (step 52 in FIG. 4). The GetBuffer( ) method obtains memory for the linear buffer for transmitting the marshalled data to the server 34. The in parameters are then copied into the buffer, and the SendReceive( ) method of the IRpcChannelBuffer interface supported by channel buffer 40 is called to transmit the method call to the server 34 (step 54 in FIG. 4). The proxy thread of execution is blocked awaiting the results of the remote call.

Channel buffer 40 then passes the buffer to the channel buffer 46 on the server side via the transport mechanism 41 (step 56 in FIG. 4). The channel buffer 46 on the server side receives the transmitted buffer from the transport 41 on a thread of execution allocated in the server context by the RPC system and calls the Invoke( ) method on the stub 42 (step 58 in FIG. 4). The thread of execution from the channel buffer 46 is blocked in the stub 42 until the method call returns. The Invoke( ) method is used to invoke a particular method through the stub 42. The stub 42 determines the method being called and sets up the parameters to be passed to the server 34. The stub 42 invokes the desired method on the server 34 using the identical in parameters that were passed from the client 32 (step 60 in FIG. 4). The method is executed on the server 34, and the server returns out parameters to the stub 42 (step 62 in FIG. 4). The stub 42 examines the out parameters and calls the GetBuffer( ) method of the IRpcStubBuffer interface that it supports to allocate a buffer in which to return the out parameters to the client 32 (step 64 in FIG. 4). The out parameters are then copied into the allocated buffer, and the stub 42 calls FreeBuffer( ) method to free the buffer for the in parameters (step 66 in FIG. 4).

Channel buffer 46 on the server side calls transport 41 to send a buffer holding the out parameters back to the client 32 (step 68 in FIG. 4). The channel buffer 46 at the client 32 receives the linear buffer holding the out parameters and passes the linear buffer to the proxy 36 (step 70 in FIG. 4). The buffer is returned as the return from the SendReceive( ) method call that was earlier initiated. The proxy 36 unmarshalls the out parameters that have been transmitted in the buffer and sets up the internal stack for the remote call return. The proxy 36 then returns to the client 32 (step 72 in FIG. 4).

Unfortunately, the event and connection architecture provided by Microsoft OLE 2.01 is also limited in several additional respects which may affect the responsiveness or efficiency of programs that are written in accordance with the model. The architecture is limited in that it does not facilitate bidirectionality of connections such that an event sink may pass back control information that primes, focuses and filters the events which the event sink considers to be of interest. An application interested in sparse events in a rich stream is forced to process all events in the stream. When interest in a set of events changes, an existing event connection must be disconnected and another event connection must be created in order to receive changes. An additional limitation is that this architecture does not support asynchronous event delivery. Events are delivered synchronously. This architecture also suffers from either a lack of responsiveness or the creation of an excess number of threads to ensure responsiveness. In general, the responsiveness of an event source is limited by the ability of the event sink to process events sent from the event source to the event sink in a timely fashion. Thus, if an insufficient number of threads are allocated, responsiveness suffers. Conversely, to guarantee responsiveness, the system must create an excessive number of threads. Another final limitation of this architecture is that it does not efficiently facilitate disparate threading models between an event source and an event sink.

The architecture provided by Microsoft® OLE 2.01 is also limited in that it does not allow third party objects to create connections. Objects must know a priori to whom they are connected. The connection mechanism is non-polymorphic.

SUMMARY OF THE INVENTION

The limitations of the prior art are overcome by the present invention. In accordance with a first aspect of the present invention, a method is practiced in a computer system that has an event source for sourcing events and an event sink for sinking events. Per the method, a method call is initiated to invoke an event on a source thread of control of the event source. The method call is received at an intermediary. The source thread of control is returned so that the source thread of control may resume execution. The method call is then invoked by the intermediary on the event sink on a separate thread that is distinct from the source thread of control.

In accordance with another aspect of the present invention, a method of connecting an event source with an event sink is practiced in a computer system. Per this method, a first connection is established from the event source to the event sink for triggering events by directly invoking events at the event sink. A second connection is established from the event sink to the event source for conveying information regarding invoking events. Thus, a bidirectional connection is established between the event source and the event sink. Identity information is maintained for the bidirectional connection created by the combination of the first connection and the second connection.

In accordance with yet another aspect of the present invention, a method of triggering an event is practiced on a computer system that has an event source for sourcing events and an event sink for sinking events. A method call is initiated to invoke the event from an event source. The method call is delivered to an intermediary who preserves the method call. The method call is asynchronously delivered from the intermediary to the event sink to invoke the event.

In accordance with an additional aspect of the present invention, a third party connector is provided for connecting an event source with an event sink. A connection is created between the event source and the event sink via the third party connector so that events from the source may be sinked to the event sink. An event is then sourced to the event source and passed through the connection to be sinked to the event sink.

In accordance with a further aspect of the present invention, a computer system includes a connection that is created between an event source object that sources an event and an event sink object by a connection point object, a proxy object, and a guardian object. The event sink object adopts a concurrency model for threads. The system also includes a connection point object that calls a method on a proxy object to invoke an event. In response, a marshalled method invocation is passed to the guardian object. The marshalled method is invoked using threads of control provided by the event sink object under its concurrency model asynchronously relative to the calling of the method on the proxy object.

In accordance with another aspect of the present invention, the computer system includes an event source for sourcing events and an event sink for sinking events that have been sourced from the event source. A first connection is provided from the event source to the event sink to facilitate triggering of events of the event sink by direct invocation by the event source. A second connection runs from the event sink to the event source to deliver control information regarding the triggering of events from the event sink to the event source.

BRIEF DESCRIPTION OF THE DRAWINGS

A preferred embodiment of the present invention will be described below relative to the following figures.

DETAILED DESCRIPTION OF THE INVENTION

The preferred embodiment of the present invention enables a computer system to allocate exactly one thread for each activity that is schedulable. This greatly enhances the efficiency of the system by substantially reducing the number of threads in the system. With the preferred embodiment of the present invention, there is no need to spawn a large number of dispatchable threads for event processing and incur the antecedent costs in time and resources. The preferred embodiment of the present invention decouples the event sink from the event source through the use of a guardian that facilitates disparate threading models and asynchronous delivery of events. An insulating mechanism is provided between the event source and the event sink to account for the disparate threading models.

The preferred embodiment of the present invention also facilitates bidirectional connections between an event source and an event sink. A backchannel connection allows an event sink to specify information about events that are of interest and events that are not of interest. The backchannel may also be used to provide priming information that the event source composes with other information to generate an event. An identity of the backchannel connection is maintained between event source and event sink for each connection. In addition, the preferred embodiment of the present invention allows third parties to create a connection between an event source. For example, a configuration file may establish a connection between a media source and an output device. Events may be asynchronously invoked such that the invocation at the event sink does not take place in the logical thread of control that is provided by the event source.

Figure 5:
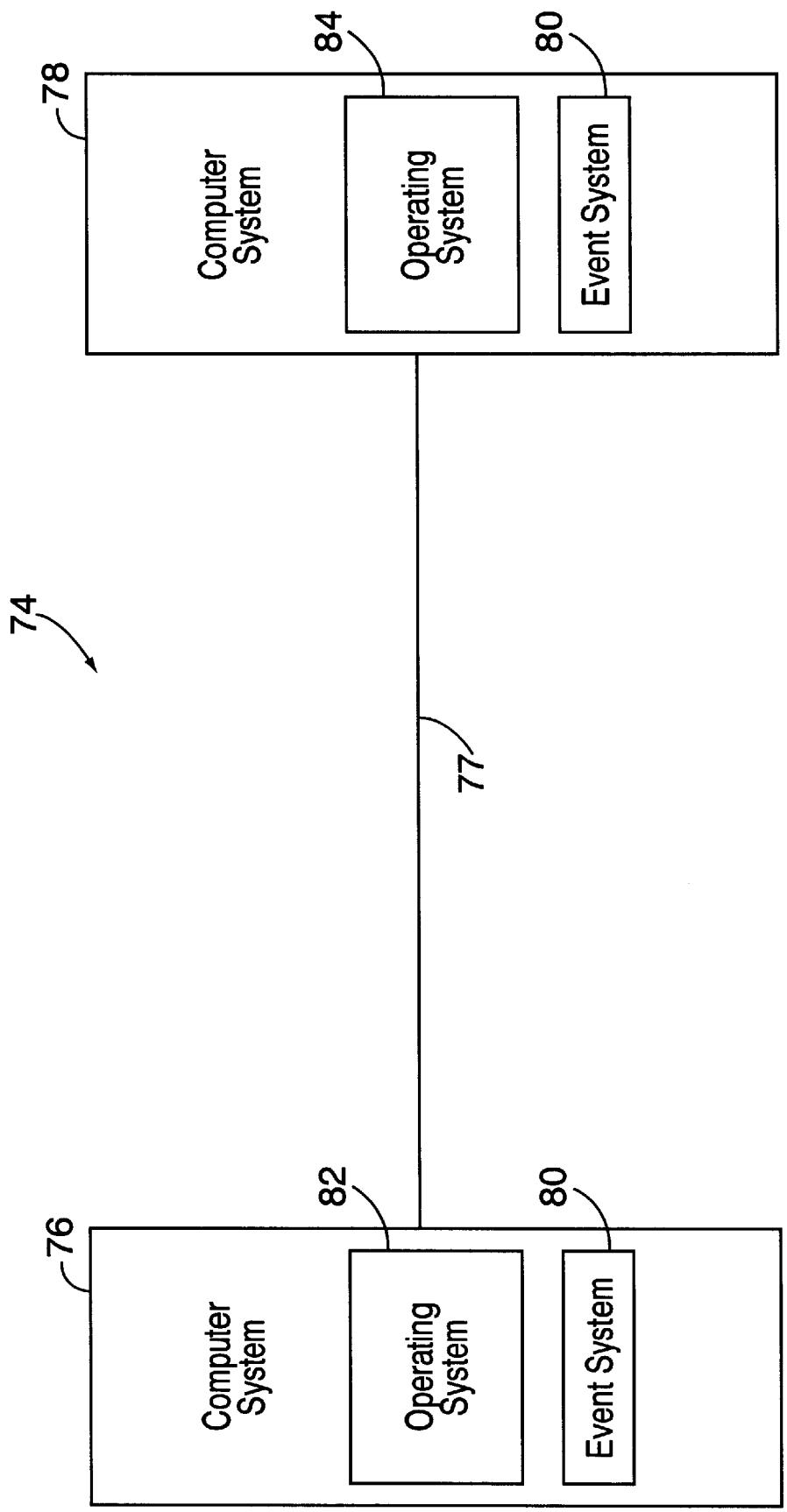
FIG. 5 is a block diagram of a distributed system that is suitable for practicing the preferred embodiment of the present invention.

FIG. 5 is a block diagram of a distributed system 74 that is suitable for practicing the preferred embodiment of the present invention. Those skilled in the art will appreciate that the present invention may also be practiced in single processor environments or in distributed environments having different configurations. The depiction of the distributed system 74 in FIG. 5 is intended to be merely illustrative and not limiting of the present invention. The distributed system 74 includes computer systems 76 and 78 that are connected via a network connection 77. Each of the computer systems 76 and 78 runs a copy of a multi-threaded operating system 82 and 84, respectively. Those skilled in the art will appreciate that the present invention may also be practiced with multi-tasking cooperatively scheduled operating systems, such as the Microsoft® Windows®, version 3.1, operating system. For purposes of the discussion below, it is assumed that the operating systems 82 and 84 provide support for the Microsoft OLE 2.01 protocol. The computer systems 76 and 78 also contain code for the event system 80 that serves to embellish the event and connection architectures provided by Microsoft OLE 2.01. These embellishments will be discussed in more detail below.

As was discussed above, the preferred embodiment of the present invention facilitates bidirectional event connections. Specifically, the preferred embodiment of the present invention facilitates the establishment of a backward connection from event sinks to event sources. This backward connection may be utilized to convey priming information, focusing information, error information, filtering information, and the like. The priming information is used in conjunction with other information that generate events at the event sources. The focusing information tells the event source the information it is to focus upon in generating events. The filtering information, in contrast, identifies things which the event sink considers to be not of interest. The backward connections are referred to as "goal connections" because hey convey goal information. Each event source is able to distinguish calls on a per connection basis for its goal connections. Hence, there exists per connection state or identity information for each goal connection. Each connection point may support goal interfaces having methods that may be called by event sinks to specify information such as priming, focusing, filtering, and error information. Each event set interface may have a corresponding one or more goal interfaces.

The preferred embodiment of the present invention utilizes guardian objects. A guardian is an intermediary object that complies with the component object model (COM) and which is created by an event sink in order to provide customization of the way in which events are delivered to the sink. In the preferred embodiment, each guardian sits between one or more event sources and a single event sink. Nevertheless, those skilled in the art will appreciate that the present invention may also use guardians which reside with event sources and guardians which process events to provide services, such as composition, translation and reordering. The guardian is not aggregated in the OLE-sense by the event sink. As will be described in more detail below, the use of such guardians in the preferred embodiment of the present invention helps to facilitate asynchronous event delivery and matching of disparate threading models.

Each generic guardian object supports the IEventGuardian interface. This interface is formally defined as follows:

```
interface IEventGuardian: IUnknown
{
    HRESULT Connect
    {
        [in] IConnectionPoint * pConnectionPoint,
        [in] REFIID riidEventSet,
        [in] IUnknown *punkSinkEventSet,
        [out] DWORD * pdwCookie
    };
    HRESULT Disconnect
    {
        [in] DWORD dwCookie
    };
    HRESULT FireEvent ();
};
```

The Connect( ) method is used to establish a connection between a connection point on an event source and an interface for an event set on an event sink. Parameters for the Connect( ) method include parameters for identifying the event sink, the event set interface and the connection point The Connect( ) method provides one out parameter, designated as a "cookie," that serves to uniquely identify the connection between the connection point and the event set interface. The cookie is obtained from the Advise( ) method of the IConnectionPoint interface. An identity of connection is maintained. The connection is disconnected by calling the Unadvise( ) method of the IConnectionPoint interface with the cookie as a parameter. The FireEvent( ) method is used to hand a thread of control to a guardian to fire a previously delivered event at the event sink. If no events are pending, this method returns a status code indicating that condition.

Figure 6:
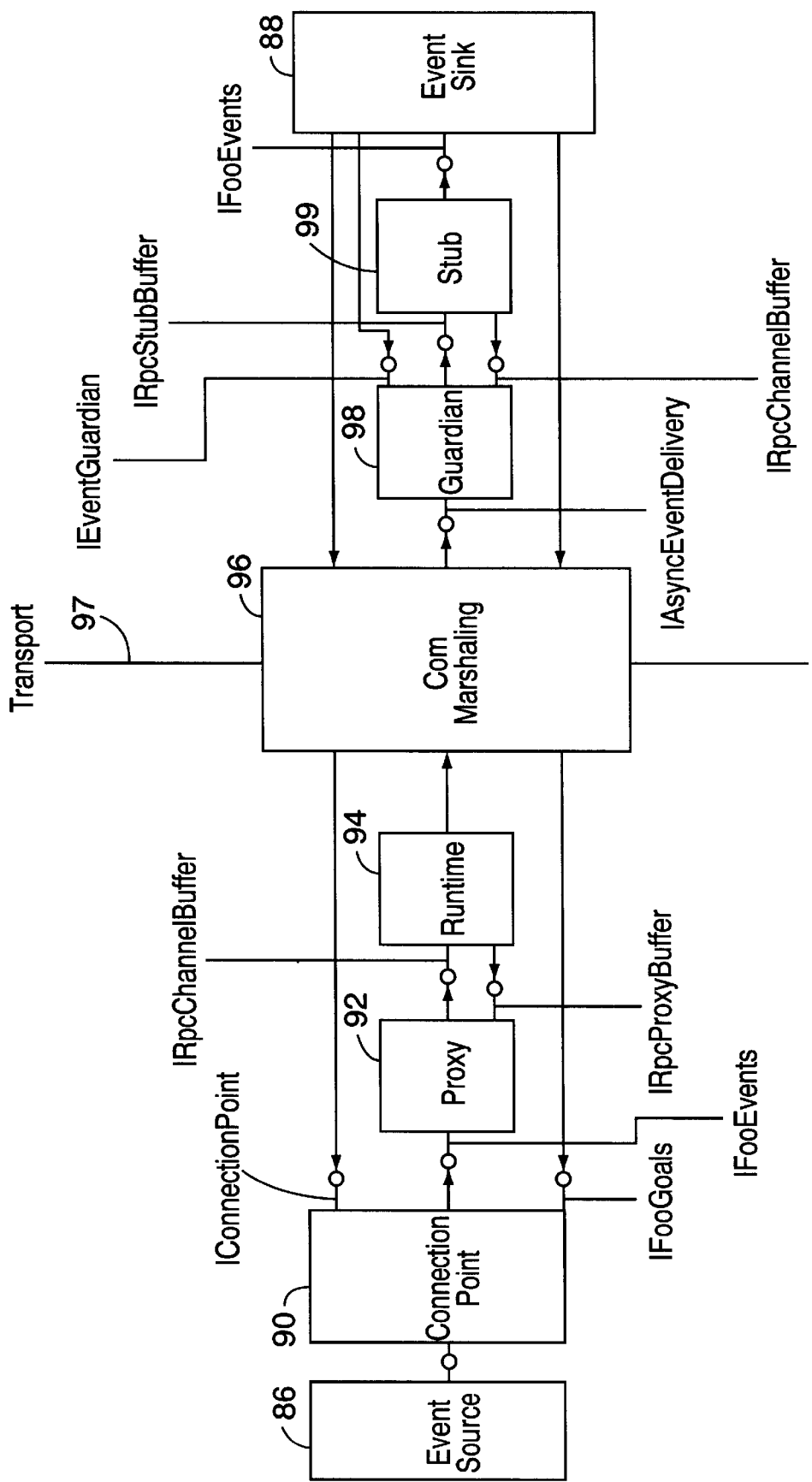
FIG. 6 is a block diagram illustrating components that play a major role in connecting an event source to an event sink in accordance with a preferred embodiment of the present invention.

An example helps to illustrate the use of the generic guardian and goal connections in the preferred embodiment of the present invention. FIG. 6 shows an example where both a guardian and goal interface are utilized. The event source 86 is a component object and a connection point container that supports the IConnectionPointContainer interface, as was described above. The event source 86 also supports the IEnumConnectionPoints interface, which is an enumerator interface that enumerates each of the connection points contained within the connection point container. In the example shown in FIG. 6, the event source 86 contains connection point 90. The connection point 90 is a separate sub-object that supports the IConnectionPoint interface (described above), as well as the IEnumConnections interface, which enumerates the connections on the connection point. The connection point 90 serves as a holder of interface pointers that represent the set of sinks which are interested in invocations on the particular event set. In the example shown in FIG. 6, the connection point 90 holds an interface pointer to the IFooEvents interface. The connection point 90 supports the IFooGoals interface, which is the goal interface that corresponds to the IFooEvents interface. The IFooGoals interface serves as a vehicle to realize the goal connection that serves as a backchannel between event sink 88 and event source 86. The event sink 88 is a component object that may invoke methods of the IFooGoals interface that are supported by the connection point 90 to transmit priming, filtering, focusing and error information. More generally, goal information may be transmitted from event sink 88 to the event source 86 through calls to methods of the IFooGoals interface instance that is supported by the connection point 90.

Figure 1:
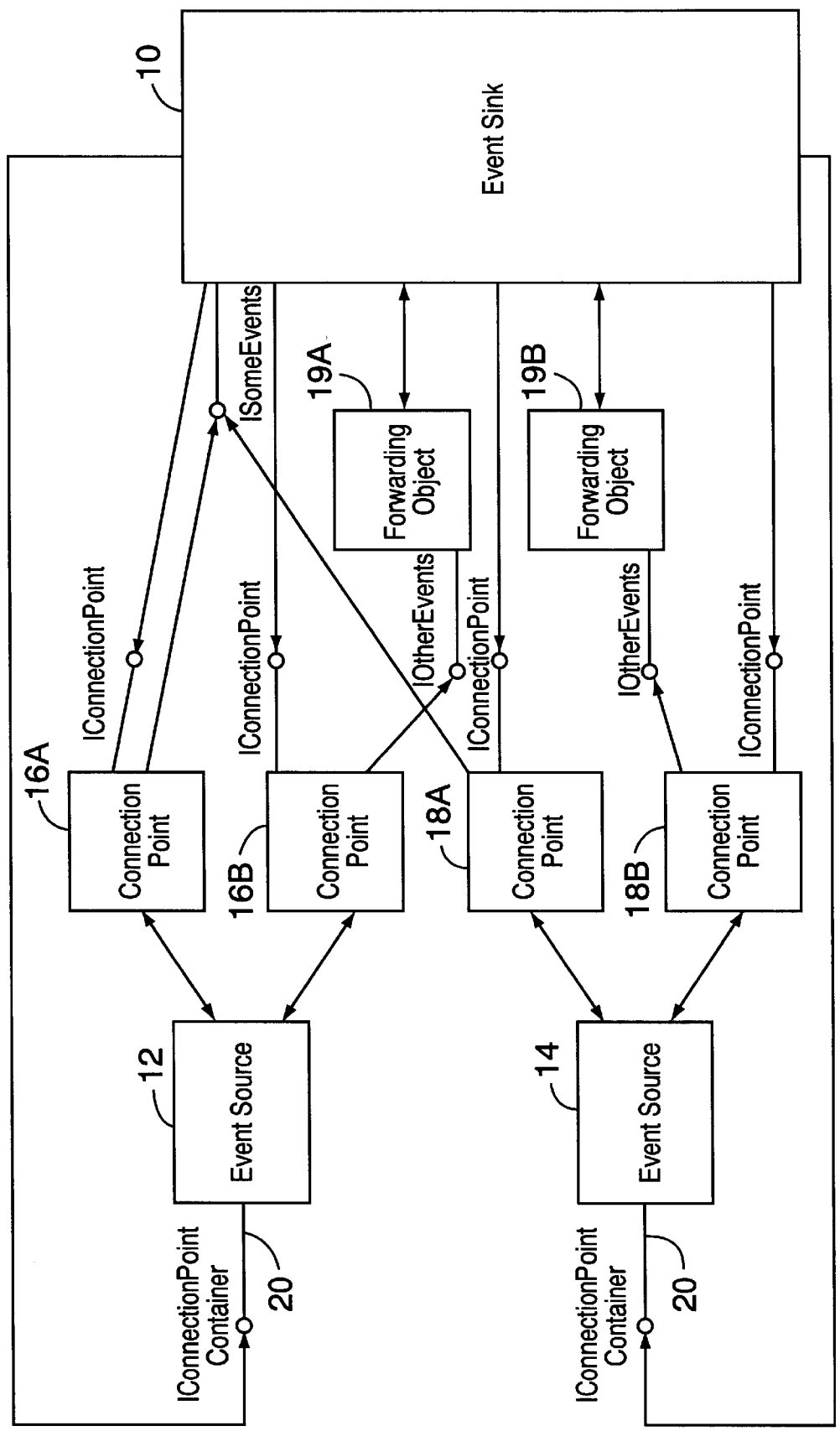
FIG. 1 is a block diagram of components that play a role in a conventional event architecture.
Figure 2:
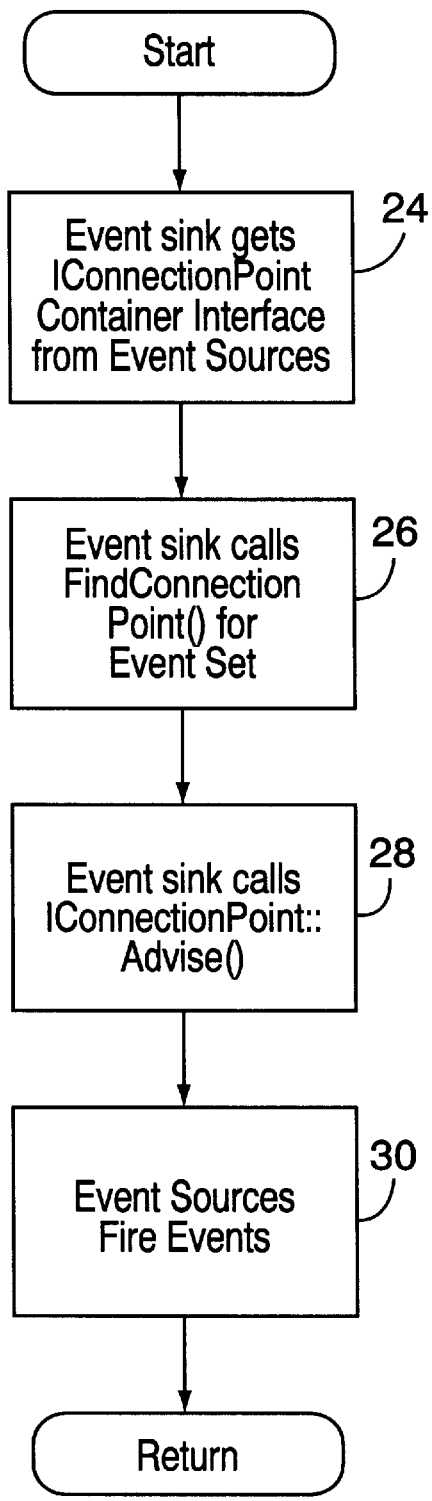
FIG. 2 is a flowchart illustrating the steps that are performed to create and use connections in the event architecture of FIG. 1.
Figure 3:
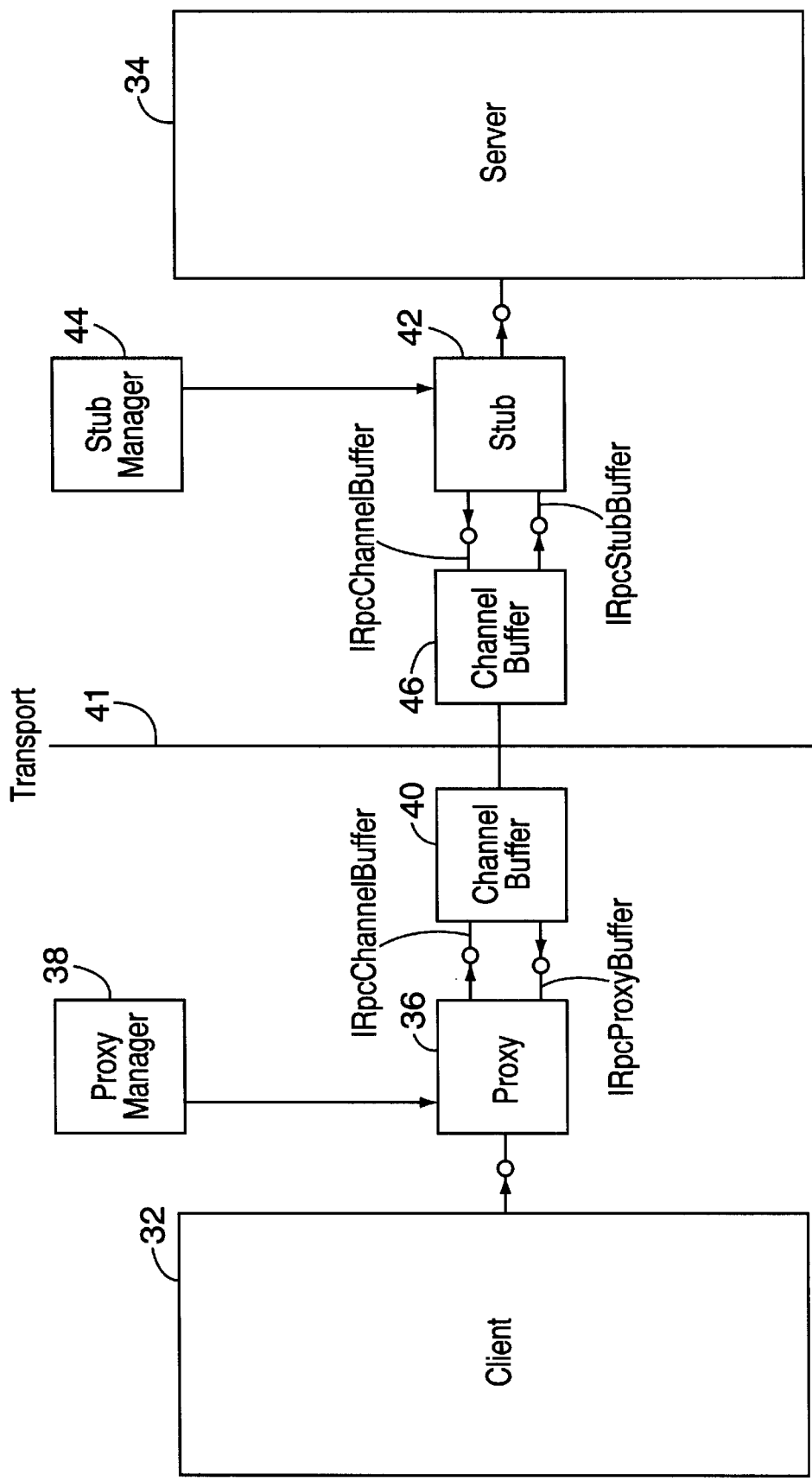
FIG. 3 is a block diagram illustrating components that play a role in a conventional marshalling mechanism.
Figure 4:
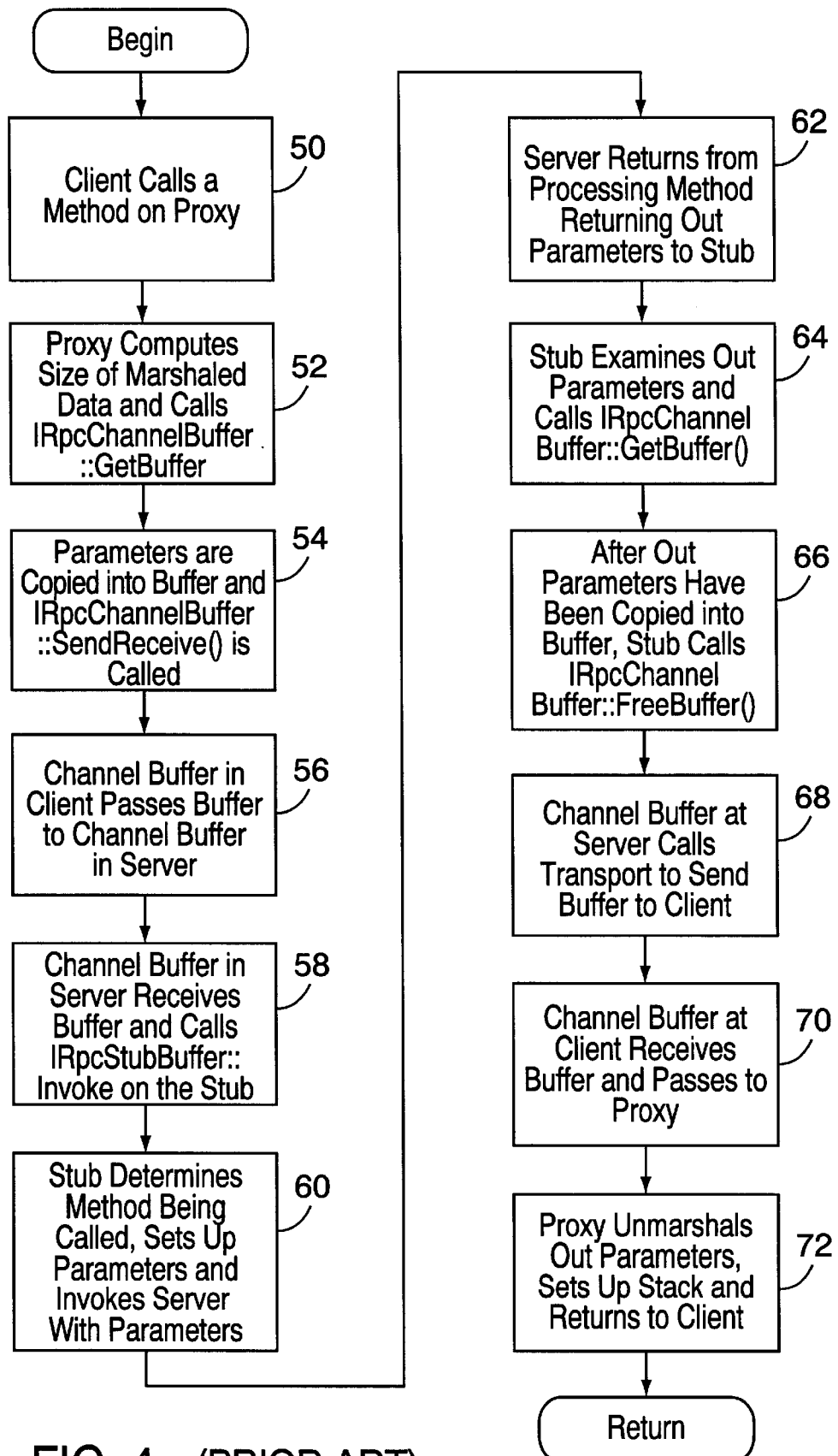
FIG. 4 is a flow chart illustrating the steps that are performed by the conventional marshalling mechanism of FIG. 3.

The connection point 90 invokes a method on the proxy 92 which causes the proxy 92 and a runtime portion 94 of the event system 80 to package method calls with parameters to the IFooEvents interface instance that is provided by the event sink 88. The packaged method call is passed through the COM marshalling mechanism 96 across the transport 97 to the guardian 98. The COM marshalling mechanism 96 is like that depicted in FIG. 3. The guardian 98 allows event invocation to occur independently of the calling thread of control that is initiated from the event source 86. The guardian 98 provides a degree of decoupling that helps to enhance the responsiveness of the system. One of the roles of the guardian 98 is to preserve a method call for later asynchronous delivery. The guardian 98 allows event invocation to operate independently of the calling thread of control because event invocation at the event sink does not take place on the logical thread of control provided by the event source. The guardian 98 insulates threading model differences between the event source 86 and the event sink. The event sink may have no threads or be a passive component that is only active when methods are called on it. The event sink 88 may, likewise, be a multi-threaded application. The event source 86 may be single-threaded or multi-threaded.

A guardian 98 may also be designated as a serial guardian in which various threading options may be selected. Each serial guardian supports the following ISerialEventGuardian interface:

```
typedef enum tagTHREADOPT
{
    THREADOPT_INVALID = 0,
    THREADOPT_SOURCE_THREAD_BLOCKING = 1,
    THREADOPT_ACTIVE_CALL_QUEUING = 2,
    THREADOPT_PASSIVE_CALL_QUEUING = 3
} THREADOPT;
interface ISerialEventGuardian: IEventGuardian
{
    HRESULT SetThreadingOoption
    {
        [in] THREADOPT threadopt
    };
    HRESULT GetThreadingOption
    {
        [out] THREADOPT * pthreadopt
    };
    HRESULT GetNumEventQueueEntries
    {
        [out] ULONG * pcEntries
    };
    HRESULT FlushEventQueue ();
    // This only makes sense for the passive call queuing threading option.
    HRESULT InvokeNextQueuedEvent ();
};
```

The ISerialEventGuardian interface allows an event sink 88 to chose three possible threading options: source read blocking, active call queuing and passive call queuing. These threading options are chosen by an event sink 88 to be used in the delivery of events from the event source 86 to the event sink.

When the event sink 88 chooses the source thread blocking option, the serial event guardian 98 does not queue up the event when the SendMethod( ) method of the IAsyncEventDelivery interface (described below) is called on the guardian to deliver an event asynchronously. Instead, the guardian 98 invokes the correct event method on the event sink 88 via the use of the stub code. This invocation of the event method on the event sink 88 blocks execution of the event source thread until the event sink is through processing the event.

When the active call queuing option is chosen by the event sink 88, the event guardian 98 queues up the event when the SendMethod( ) method is called on the guardian. The source thread is not blocked. The event guardian 98 creates a thread of execution on behalf of the event sink 88. This thread is used to process queued events. The thread waits until an event is queued up by the event guardian 98 and then becomes active to drain the event queue of all events. This option allows the event source 86 to continue to execute while the event sink 88 is processing events from the queue on a separate thread of execution.

When the passive call queuing option is chosen by the event sink 88, events are queued and the event source 80 is allowed to continue to execute. This event sink 88 must call the serial event guardian 98 via the InvokeNextQueuedEvent( ) method in order to process events in the event queue. Each invocation of this method executes only a single one of the queued events.

The SetThreadingOption( ) method allows the event sink 88 to set the appropriate threading options. Similarly, the GetThreadingOption( ) method allows retrieval of the current threading option, and the GetNumEventQueueEntries( ) method returns the number of entries that are currently in the event queue for the event guardian 98. Lastly, the FlushEventQueue( ) method discards all events that are queued in the event queue of the event guardian 98.

Several requirements are imposed on the event interfaces (such as IFooEvents) to realize asynchronous event delivery. The interfaces must be re-entrant (i.e., non-self modifying) and include no out parameters. The guardian 98 possesses the knowledge to know how to set up an asynchronous invocation event connection to the event source 86. The guardian 98 supports the IAsyncEventDelivery interface, which contains method for asynchronously delivering events. The interface is defined formally as follows:

```
interface IAsyncEventDelivery: IUnknown
{
    HRESULT EstablishSession
    {
        [in] REFIID riidEventSet,
        [out] DWORD * pdwSessCookie
    };
    HRESULT SendMethod
    {
        [in] DWORD dwSessCookie,
        [in] ULONG iMethod;
        [in] ULONG ulDataRepresentation,
        [in] ULONG ulMethod,
        [in] ULONG cbMethodData,
        [in, size_is (cbMethodData)]
        BYTE * pbMethodData
    };
    HRESULT EndSession
    {
        [in] DWORD dwSessCookie
    };
};
```

The EstablishSession( ) method establishes a delivery session between a guardian and the runtime portion 94 of the event system 80. A unique session cookie for the session is returned as an out parameter. The session cookie is a value that uniquely identifies the session. The only in parameter is the IID for the event set interface. A corresponding EndSession( ) method ends the session that has been established for delivery.

The SendMethod( ) function is utilized to deliver an event asynchronously. The parameters specify-the session cookie, the data representation, the method be called and data for the method call. It should be appreciated that this interface may be also implemented directly by an event sink 88.

Figure 7:
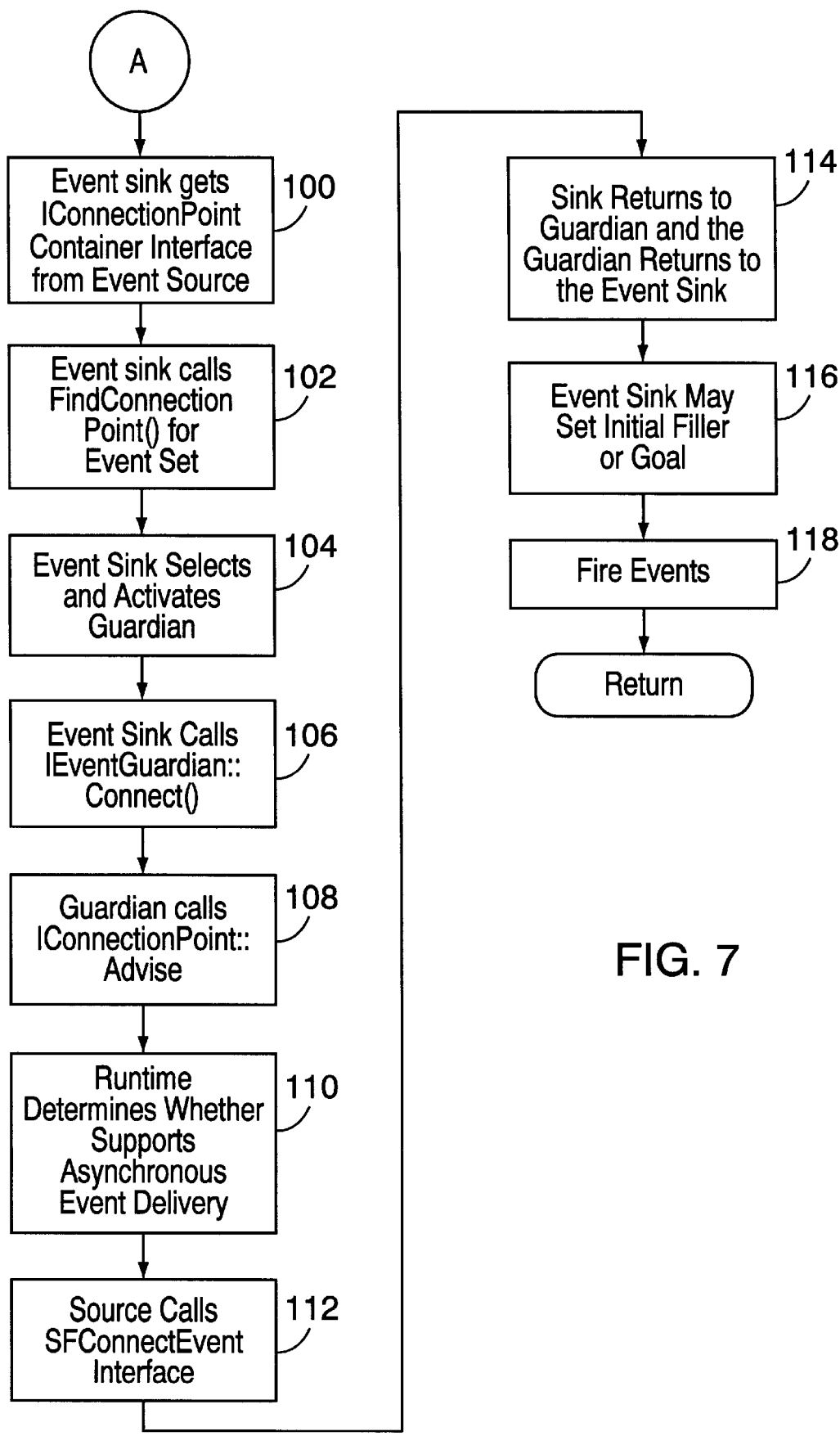
FIG. 7 is a flowchart illustrating the steps that are performed to create and fire events in the preferred embodiment to the present invention.

The guardian 98 cooperates with the stub 99 to invoke the event sink 88. FIG. 7 is a flowchart that shows in more detail how the event connection is created to fire events in a situation like that depicted in FIG. 6. Initially the event sink 88 contains an interface pointer for the IConnectionPointContainer interface from the event source 86 (step 100 in FIG. 7). The event sink then calls the FindConnectionPoint( ) method of the IConnectionPointContainer interface that is supported by the event source 86 (step 102 in FIG. 7). The in parameter to the method call for the FindConnectionPoint( ) method identifies the event set interface. The event sink 88 then selects and, if necessary, activates the guardian 98 (step 104 in FIG. 7).

Event sink 88 calls the Connect( ) method of the IEventGuardian interface supported by the guardian 98 (step 106 in FIG. 7). This call causes the connection to be established between the guardian and the event set interface. The guardian 98 then calls the Advise( ) method of the IConnectionPoint interface supported by the connection point 90 (step 108 in FIG. 7). As a result, the connection between the connection point and the guardian is established. The runtime portion 94 of the event system 80 then determines whether events are to be delivered synchronously or asynchronously. In particular, the runtime portion 94 calls QueryInterface( ) method of the IUnknown interface that is passed as a parameter on the call to the Advise( ) method of the IConnectionPoint interface. The QueryInterface call asks for the IAsyncEventDelivery interface to determine whether the events are to be delivered synchronously or asynchronously. Assuming that the events are to be delivered asynchronously, the guardian 98 responds affirmatively and returns a pointer to its IAsyncEventDelivery interface (see step 110 in FIG. 7). The connection point 90 then calls a new runtime application program interface (API) SFConnectEventInterface( ) method to establish the connection. This API call causes the proxy 92 to be loaded and configured for the desired event set interface (step 112 in FIG. 7). The proxy 92 is connected to an instance of the IRpcChannelBuffer interface that is provided by the runtime portion 94. The implementation of the IRpcChannelBuffer interface maps the SendReceive( ) method invocations of that interface to invocations of the SendMethod( ) method of the IAsyncEventDelivery interface.

After the connection is established the event sink 88 returns to the guardian 98 and the guardian 98, in turn, returns to the event sink 88 (step 114) in FIG. 7. Each of these returns returns the appropriate type of cookie. The event sink may then set an initial filter or goal by calling QueryInterface on the connection point 90 to obtain an interface pointer for the GoalEventSet interface (step 116 in FIG. 7). Such goal information is conveyed synchronously. The system may then begin to fire events (step 118 in FIG. 7).

Figure 8A:
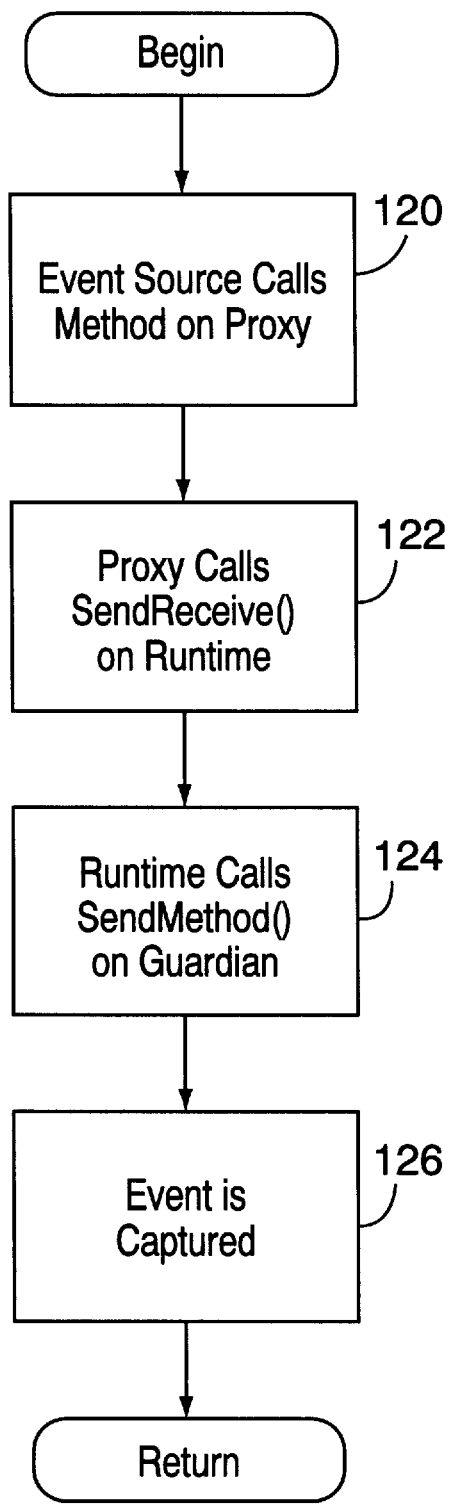
FIG. 8A is a flowchart illustrating the steps that are performed to trigger events when a guardian is used in the preferred embodiment of the present invention.

In order to fire events asynchronously, the event source 86 calls a method on the proxy through the connection point 90 (step 120 in FIG. 8A). In the example shown in FIG. 6, the connection point 90 may call a method in the IFooEvent interface that is supported by the proxy 92. The proxy 92 then calls the SendReceive( ) method of the IRpcChannelBuffer interface supported by the runtime portion 94 of the event system 80 (step 122 in FIG. 8A). The implementation of the IRpcChannelBuffer interface maps the invocations to SendMethod( ) invocations at the guardian 98. The invocation of SendMethod( ) contains a marshalled method indication and source thread meta-data. Thus, the runtime portion 94 calls the SendMethod( ) method on the guardian 98 with the appropriately marshalled parameters (step 124 in FIG. 8A). This method then performs the appropriate steps to asynchronously invoke the event method using threads of control provided by the event sink under the event sink's concurrency model. In particular, the event sink 88 calls the FireEvent( ) method of the guardian 98 (step 126 in FIG. 8A).

Figure 8B:
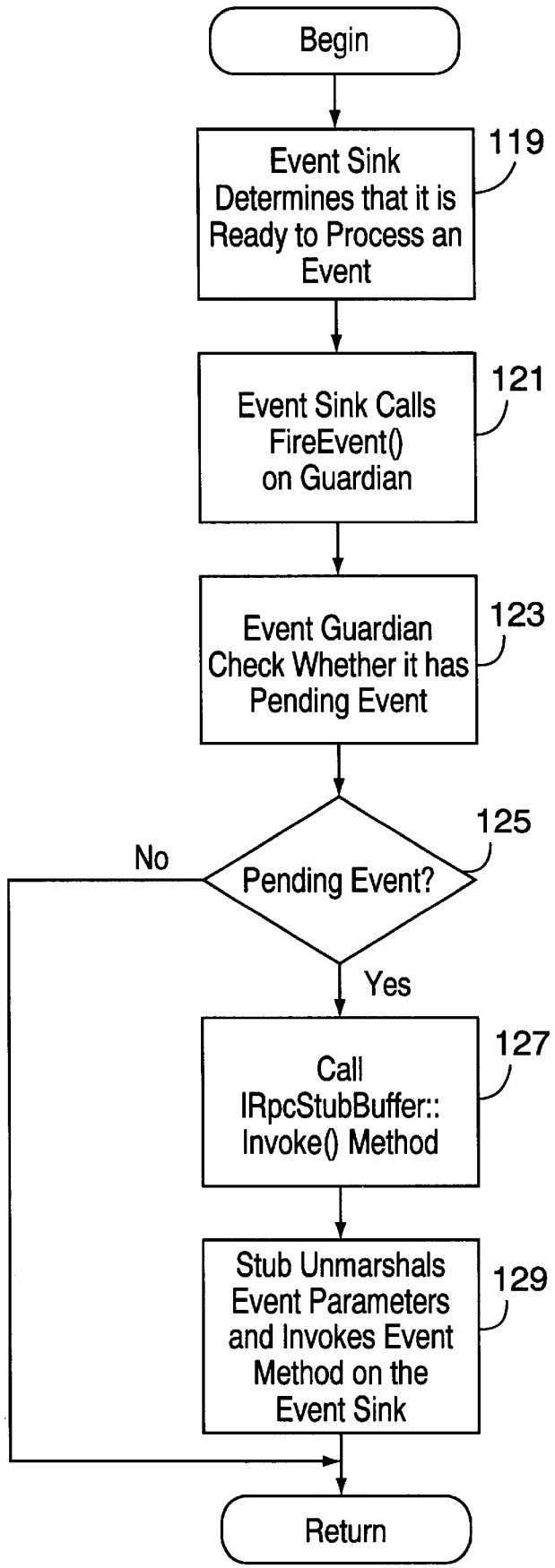
FIG. 8B is a flowchart illustrating the steps that are performed by the FireEvent( ) method of the preferred embodiment of the present invention.

The synchronous invocation of the event method of step 126 in FIG. 8A involves a number of additional steps that are depicted in FIG. 8B. Initially, the event sink determines that it is ready to process an event (step 119 in FIG. 8B). The event sink then calls the FireEvent( ) on the event guardian 98 (step 121 in FIG. 8B). The event guardian 98 checks whether it has any pending events (see steps 123 and 125 in FIG. 8B). If the event guardian does not have any pending events, no events are fired. In contrast, if the event guardian 98 has a pending event, it calls the Invoke( ) method of the IRpcStubBuffer interface that is supported by the stub 99 (step 127 in FIG. 8B). As a result of this call, the stub 99 unmarshalls event parameters passed in the Invoke( ) method call and invokes the event method on the event sink 88 (step 129 in FIG. 8B).

Figure 9:
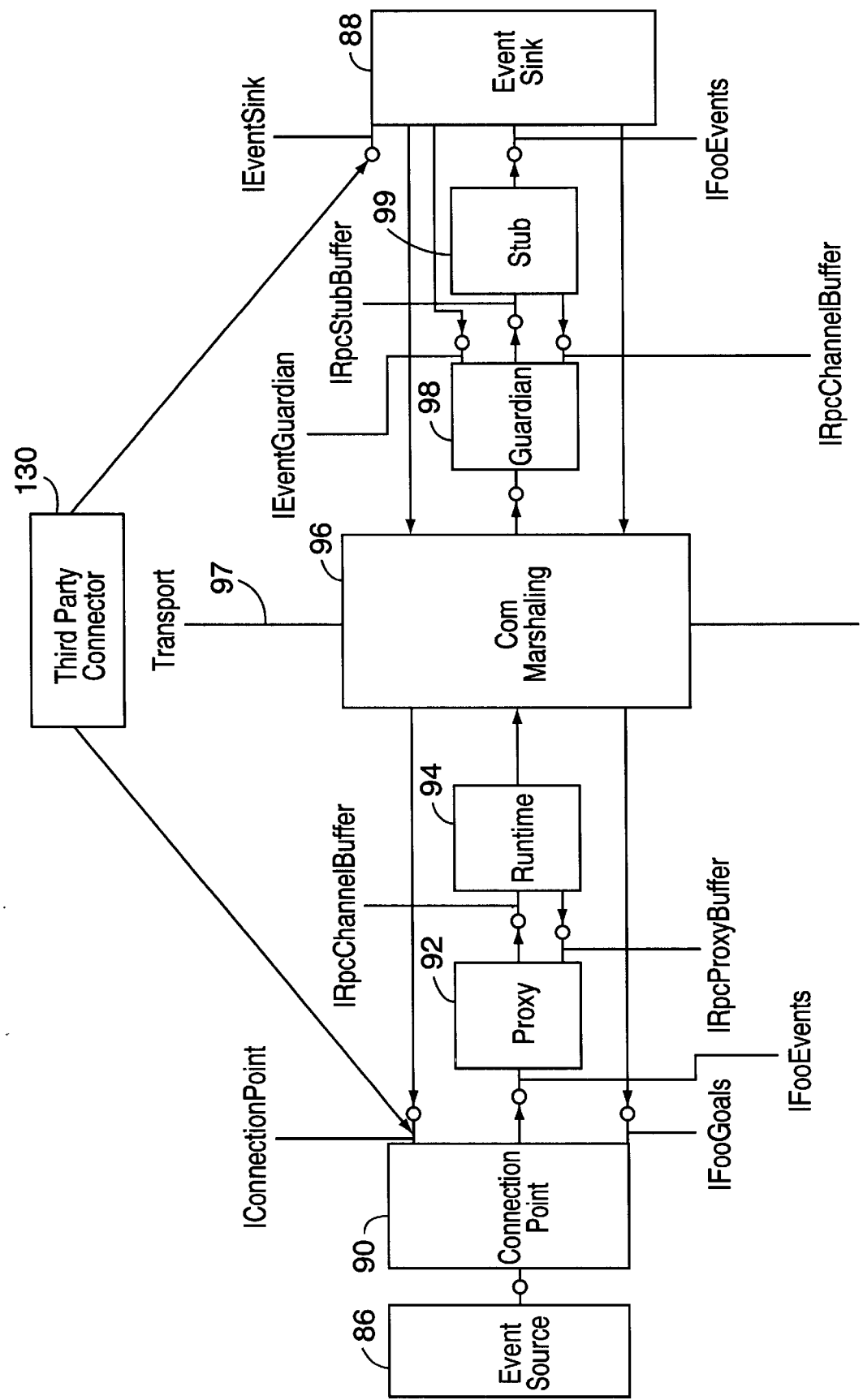
FIG. 9 is a block diagram illustrating the components that play a role when a third party connector is used in the preferred embodiment of the present invention.
Figure 10:
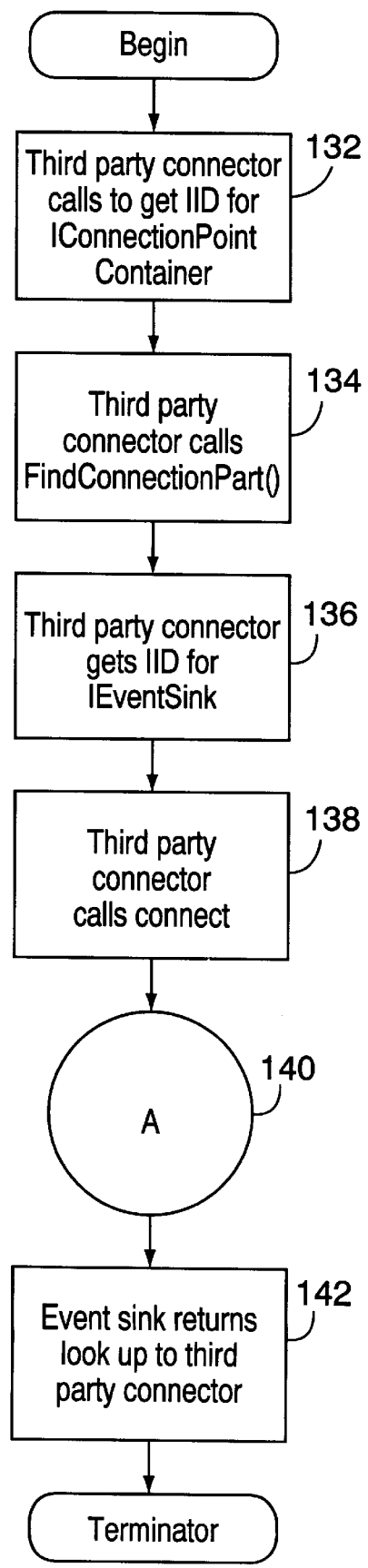
FIG. 10 is a flowchart illustrating the steps that are performed to create a connection between an event source and an event sink using a third party connector in the preferred embodiment of the present invention.

As also mentioned above, the preferred embodiment of the present invention supports the connection of an event source 86 with an event sink 88 by a third party connector 130, such as shown in FIG. 9. FIG. 10 is a flowchart of the steps that are performed to realize such a third party connection. Initially, the third party connector 130 calls the QueryInterface( ) method to get the interface pointer for the IConnectionPointContainer interface that is supported by the event source 86 (step 132 in FIG. 10). The third party connector uses the interface pointer for the IConnectionPointContainer interface to call the FindConnectionPoint( ) method of that interface on the event source 86 (step 134 in FIG. 10). The third party connector 130 receives an interface pointer for the IConnectionPoint interface of the connection point 90 as a result of this function call. The third party connected then calls the QueryInterface( ) method to get an interface pointer for the IEventSink interface that is supported by the event sink 88 (step 136). The third party connector calls the Connect( ) method of the IEventSink interface on the event sink 88 to begin the process of creating a connection (step 138). These steps shown in the flowchart of FIG. 7 are then performed. Once the connection is established, the event sink 88 returns a cookie to the third party connector 130 (step 142 in FIG. 10).

While the present invention has been described with the reference to a preferred embodiment thereof, those skilled in the art will appreciate that various changes in form and detail may be made without departing from the intended scope of the invention as defined in the appended claims.

What is claimed is:

1. In a computer system having an event source for sourcing a set of events and an event sink for sinking the set of events, a method of connecting the event source and the event sink, comprising the steps of:

establishing a first connection from the event source to the event sink for triggering events by directly invoking events at the event sink;

establishing a second connection from event sink to the event source for conveying information regarding invoking events; and maintaining identity information to identify a bidirectional connection that is created by the first connection and the second connection between the event source and the event sink.

2. The method of claim 1, further comprising the step of directly invoking events at the event sink via the first connection.

3. The method of claim 1 wherein no state information about the first connection is passed in directly invoking events at the event sink via the first connection.

4. The method of claim 1, further comprising the step of conveying information from the event sink to the event source via the second connection.

5. The method of claim 1, further comprising the step of sending filtering information that identifies what events are not of interest to the event sink over the second connection from the event sink to the event source.

6. The method of claim 1, further comprising the step of sending priming information, that is used by the event source to trigger events, from the event sink to the event source.

7. In a computer system having an event source for sourcing events and an event sink for sinking events, a method of triggering an event, comprising the steps of:

initiating a method call to invoke the event from an event source;

delivering the method call to an intermediary which preserves the method call; and asynchronously delivering the method call from the intermediary to the event sink to invoke the event.

8. The method of claim 7 wherein the intermediary supports an interface for asynchronous deliver of events to the event sink.

9. The method of claim 7 wherein the event source provides a logical thread of control and wherein the delivery of the method call is performed on a distinct thread from the logical thread of control provided by the event source.

10. The method of claim 7 wherein computer system includes multiple computers and wherein the event sink and the event source reside on ones of the computers that have different ways of handling threading.

11. The method of claim 7 wherein the computer system runs a cooperative multi-tasking non-multi-threaded operating system.

12. The method of claim 7 wherein the computer system includes multiple computers and the event sink resides on a different one of the computers than the event source.

13. In a computer system having an event source for sourcing events and an event sink for sinking events, a method comprising the steps of:

providing a third party component for connecting the event source with the event sink;

creating a connection between the event source and the event sink by an action of the third party component so that events from the source may be sinked at the event sink; and creating a back channel connection from the event sink to the event source for passing controlled information from the event sink to the event source.

14. The method of claim 13 wherein the event that is sourced at the event source is delivered asynchronously to the event sink.

15. The method of claim 13 wherein the event source and the event sink are separate processes.

16. The method of claim 13, further comprising the steps of sourcing an event at the event source and passing the event through the connection to be sinked at the event sink.

17. The method of claim 13 wherein the third party component serves as a polymorphic connector.

18. The method of claim 13 wherein the computer system includes multiple computers and wherein the event source and the event sink reside on separate ones of the computers.

19. A computer system comprising:

an event source for sourcing events;

an event sink for sinking events that have been sourced from the event source;

a first connection from the event source to the event sink to facilitate triggering of events at the event sink by direct invocation by the event source;

a second connection from the event sink to the event source for delivering control information regarding the triggering of the events from the event sink to the event source.

* * * * *

UNITED STATES PATENT AND TRADEMARK OFFICE
CERTIFICATE OF CORRECTION

PATENT NO. : 6,557,046 B1
DATED : April 29, 2003
INVENTOR(S) : David E. McCauley, III et al.

It is certified that error appears in the above-identified patent and that said Letters Patent is hereby corrected as shown below:

Title page,
Item [56], References Cited, OTHER PUBLICATIONS, in "Programming Windows", Microsoft Press, 1988, pps. 61-23 and 169-171 delete "61" and insert -- 16 --.

Column 2,
Line 57, delete "interface XConnectionPoint:" and insert -- interface IConnection Point: --.

Column 3,
Line 19, insert -- . -- after "connect".
Line 45, delete "unbroken-path" and insert -- unbroken path --.

Column 8,
Line 37, delete "hey" and insert -- they --.

Column 9,
Delete the table and insert the following table:

```
interface IEventGuardian: IUnknown
{
        HRESULT Connect
            (
                [in] IConnectionPoint * pConnectionPoint,
                [in] REFIID riidEventSet,
                [in] IUnknown *punkSinkEventSet,
                [out] DWORD * pdwCookie
            );
        HRESULT Disconnect
            (
                [in] DWORD dwCookie
            );
        HRESULT FireEvent ( );
};
```

UNITED STATES PATENT AND TRADEMARK OFFICE
CERTIFICATE OF CORRECTION

| | | |
|---|---|---|
| PATENT NO. | : 6,557,046 B1 | Page 2 of 3 |
| DATED | : April 29, 2003 | |
| INVENTOR(S) | : David E. McCauley, III et al. | |

It is certified that error appears in the above-identified patent and that said Letters Patent is hereby corrected as shown below:

<u>Column 10,</u>
Delete the table and insert the following table:

```
typedef enum tagTHREADOPT
{
        THREADOPT_INVALID = 0,
        THREADOPT_SOURCE_THREAD_BLOCKING = 1,
        THREADOPT_ACTIVE_CALL_QUEUING = 2,
        THREADOPT_PASSIVE_CALL_QUEUING = 3,
} THREADOPT;
interface IserialEventGuardian : IEventGuardian
{
        HRESULT SetThreadingOption
        (
                [in] THREADOPT threadopt
        );
        HRESULT GetThreadingOption
        (
                [out] THREADOPT * pthreadopt
        );
        HRESULT GetNumEventQueueEntries
        (
                [out] ULONG * pcEntries
        );
        HRESULT FlushEventQueue ( );
        // This only makes sense for the passive call queuing threading option.
        HRESULT InvokeNextQueuedEvent ( );
}
```

Line 51, delete "read" and insert -- thread --.

UNITED STATES PATENT AND TRADEMARK OFFICE
CERTIFICATE OF CORRECTION

PATENT NO.    : 6,557,046 B1
DATED         : April 29, 2003
INVENTOR(S)   : David E. McCauley, III et al.

It is certified that error appears in the above-identified patent and that said Letters Patent is hereby corrected as shown below:

<u>Column 11,</u>
Delete the table and insert the following table:

```
interface IAsyncEventDelivery: IUnknown
{
        HRESULT EstablishSession
                (
                        [in] REFIID riidEventSet,
                        [out] DWORD * pdwSessCookie
                );
        HRESULT SendMethod
                (
                        [in] DWORD dwSessCookie,
                        [in] ULONG iMethod;
                        [in] ULONG ulDataRepresentation,
                        [in] ULONG ulMethod,
                        [in] ULONG cbMethodData,
                        [in, size_is (cbMethodData)]
                                BYTE * pbMethodData
                );
        HRESULT EndSession
                (
                        [in] DWORD dwSessCookie
                );
};
```

Line 64, delete "specify-the" and insert -- specify the --.

Signed and Sealed this

Fourth Day of November, 2003

JAMES E. ROGAN
*Director of the United States Patent and Trademark Office*